United States Patent [19]

Vizziello et al.

[11] 3,799,224
[45] Mar. 26, 1974

[54] RAFTER BEAM NOTCHING APPARATUS

[75] Inventors: Vito M. Vizziello, Hamden, Conn.; Charles A. Bouteiller, Barrington, Mass.

[73] Assignee: New England Log Homes, Inc., New Haven, Conn.

[22] Filed: Feb. 16, 1973

[21] Appl. No.: 333,063

[52] U.S. Cl. .......... 144/133, 144/134 B, 144/136 R, 83/613, 83/699
[51] Int. Cl. .............................. B27c 5/02
[58] Field of Search ............ 144/133, 136 R, 136 H, 144/134 R, 134 B, 136 G; 83/698, 613, 699

[56] References Cited
UNITED STATES PATENTS

| | | | |
|---|---|---|---|
| 3,470,924 | 10/1969 | Short | 144/133 R |
| 3,331,413 | 7/1967 | Hoffman | 144/136 R |
| 1,767,208 | 6/1930 | Gillooly | 144/133 R |

Primary Examiner—Andrew R. Juhasz
Assistant Examiner—W. D. Bray
Attorney, Agent, or Firm—DeLio and Montgomery

[57] ABSTRACT

Rafter beam notching apparatus in which a power driven rotary saw is fixedly mounted on a pair of rods which travel horizontally in unison through the superstructure of a frame. The frame includes a table for horizontal placement thereon of a rafter beam to be notched. A first vertical support plate is fixedly mounted on the rod transversely thereof so as to travel with the rods, and has at least one guide pin projecting from a surface thereof. A second vertical support plate has at least one guide slot therethrough positioned to receive the guide pin of the first plate such that the second plate may be arranged in coplanar contact with the first plate in a plurality of predetermined positions. The second plate fixedly supports the motor of the rotary saw such that the cutter of the saw extends downwardly between the rods. The saw thus may be set at a plurality of angles to the horizontal corresponding to the plurality of positions of the second plate on the first plate, whereby notches of predetermined dimensions may be cut in the beam without requiring inclination of the beam.

6 Claims, 4 Drawing Figures

RAFTER BEAM NOTCHING APPARATUS

BACKGROUND OF THE INVENTION

This invention relates to new and improved apparatus and machinery for the notching of wood products, particularly rafter beams used in the construction of roof portions of buildings.

A "rafter notch" (also known in the trade as a "bearcut" or a "bird's mouth cut") is an angled side cut made in a beam for the purpose of joining the beam, when inclined to define a roof line, to a vertical beam which comprises a portion of a side wall of a building. The angle and depth to which the rafter notch is cut, and other dimensions of the cut, must be carefully predetermined in accordance with the pitch desired in the roof. The rafter beams support the roofing slats or other outside roofing materials of a building.

In the mass production of rafter beams in the building industry, especially whole log buildings, it is also important that the saw which is used to cut the rafter notch can be conveniently shifted to accommodate rafter notches of different depths and angles, and also that the saw can be rigidly stationed so that the notch is cut precisely the same way in each beam. Such reafter notches conventionally are cut by setting a rotary saw at a constant angle and then inclining the beam to be notched sufficiently from the horizontal so that it will be cut when the saw is brought into contact by a turn screw or the like. This known method is often imprecise and awkward because the beam to be notched normally is extremely heavy and of considerable length, thus preventing convenient and accurate placement of the beam in relation to the saw. Moreover, it will be evident that the angle of inclination of the beam, rather than the angle of the saw, controls the angle and other dimensions of the cut. This also detracts from the efficiency and accuracy of the cutting operation.

OBJECTS AND SUMMARY

Accordingly, an object of the invention is to provide new and improved rafter beam notching apparatus wherein a power driven rotary saw is horizontally movable for cutting contact with the beam such that the beam does not require inclination from the horizontal for control of the angle and depth of the notch to be cut.

Another object is to provide new and improved rafter beam notching apparatus in which the dimensions of the notch are controlled by setting of the angle of contact of a power driven rotary saw rather than by manipulation of the beam.

These and other objects, features and advantages of the invention will be apparent from the specification which follows.

In summary outline, the objects of the invention are achieved by rafter beam notching apparatus in which a power driven rotary saw is fixedly mounted on a pair of rods which travel horizontally in unison through the superstructure of a frame. The frame includes a table for horizontal placement thereon of a rafter beam to be notched. A first vertical support plate is fixedly mounted on the rod transversely thereof so as to travel with the rods, and has at least one guide pin projecting from a surface thereof. A second vertical support plate has at least one guide slot therethrough positioned to receive the guide pin of the first plate such that the second plate may be arranged in coplanar contact with the first plate in a plurality of predetermined positions. The second plate fixedly supports the motor of the rotary saw such that the cutter of the saw extends downwardly between the rods. The saw thus may be set at a plurality of angles to the horizontal corresponding to the plurality of positions of the second plate on the first plate, whereby notches of predetermined dimensions may be cut in the beam without requiring inclination of the beam.

The invention accordingly comprises the features of construction, combination of elements, and arrangement of parts which will be exemplified in the construction hereinafter set forth, and the scope of the invention will be indicated in the claims.

DETAILED DESCRIPTION

For a fuller understanding of the nature and objects of the invention, reference is made to the following description taken in conjunction with the accompanying drawings, in which.

Figure 2:
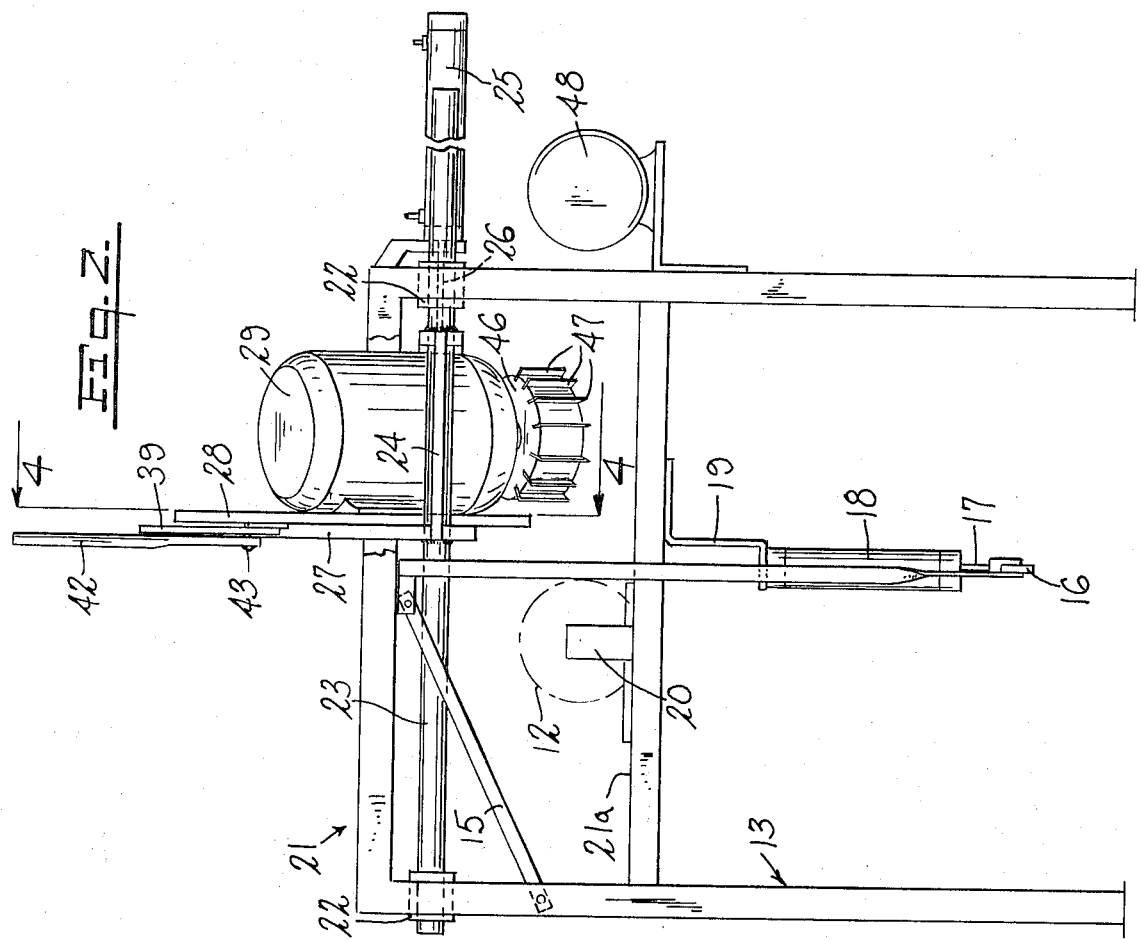
FIG. 2 is a view of apparatus of FIG. 1, taken from another side, laterally of a log or beam to be notched.
Figure 1:
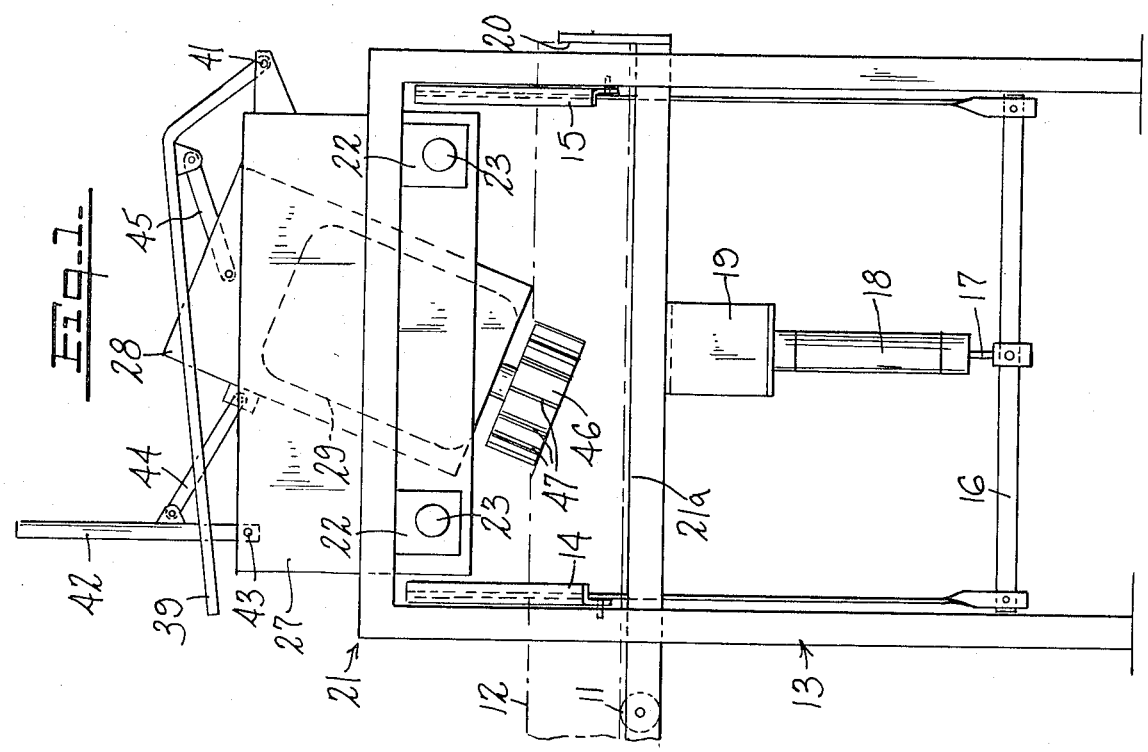
FIG. 1 is a side view of apparatus of the invention, longitudinal of a log or beam to be notched.
Figure 3:
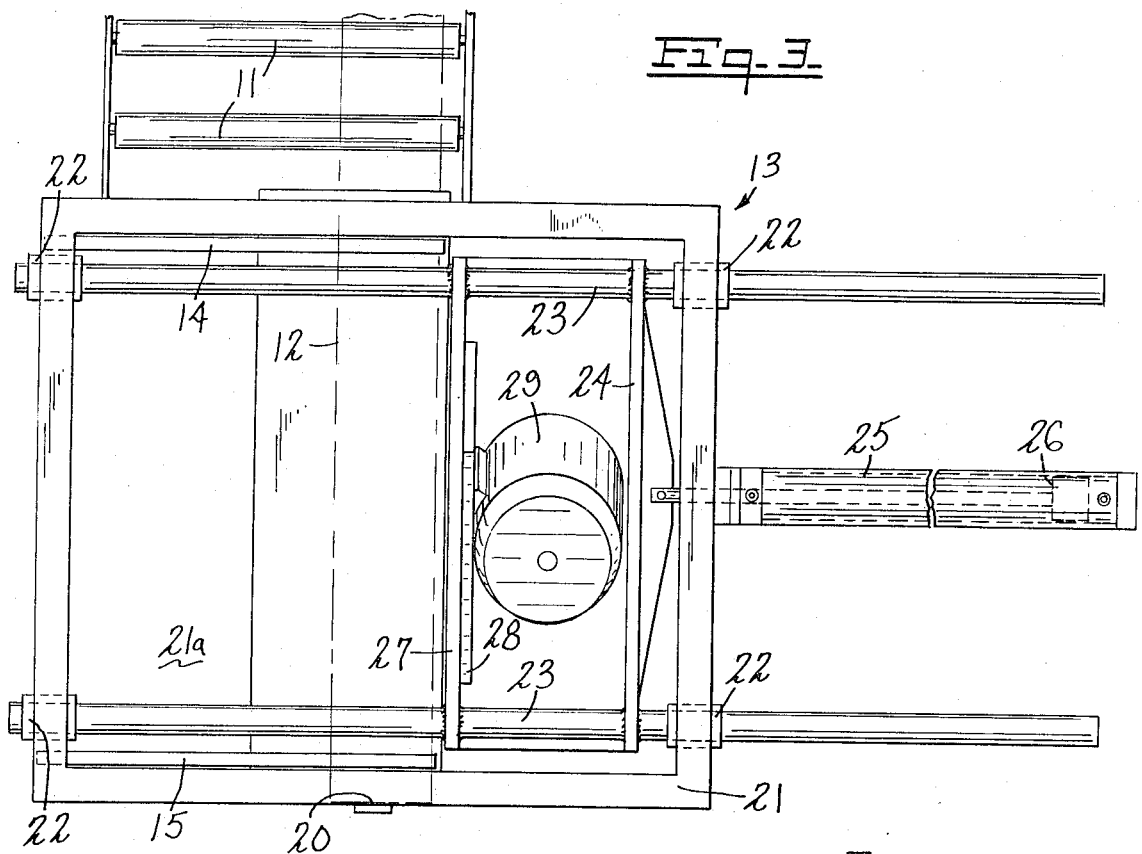
FIG. 3 is a top view of the apparatus of FIGS. 1 and 2.

With reference to the Figures, a series of rollers 11 permits horizontal feeding of a log or beam 12 into a frame 13 which supports a radial notching saw. The log 13 may be held in place within the frame 13 by clamping bars 14 and 15, the latter being linked to a cross arm 16. The cross arm 16 is hydraulically operated by a piston rod 17 with its piston cylinder 18 mounted to the frame 13 by a support plate 19. A stop 20 assists positioning of the log in the frame.

The superstructure 21 of the frame, above the platform or table 21a, has four bearings 22 which support a pair of generally parallel sliding rods 23. Fixedly mounted on the slide rods 23 is a horizontal, rectangular support frame 24. The slide rods 23 reciprocate horizontally in unison under urging by a hydraulic cylinder 25 and its piston 26. Fastened vertically to one side of the support frame 24, transversely of the sliding rods 23, is a stationary indexing plate 27. Affixed to a vertical, movable indexing plate 28 (which is coplanar with the stationary plate 27) is the motor 29 of an electric radial saw.

Figure 4:
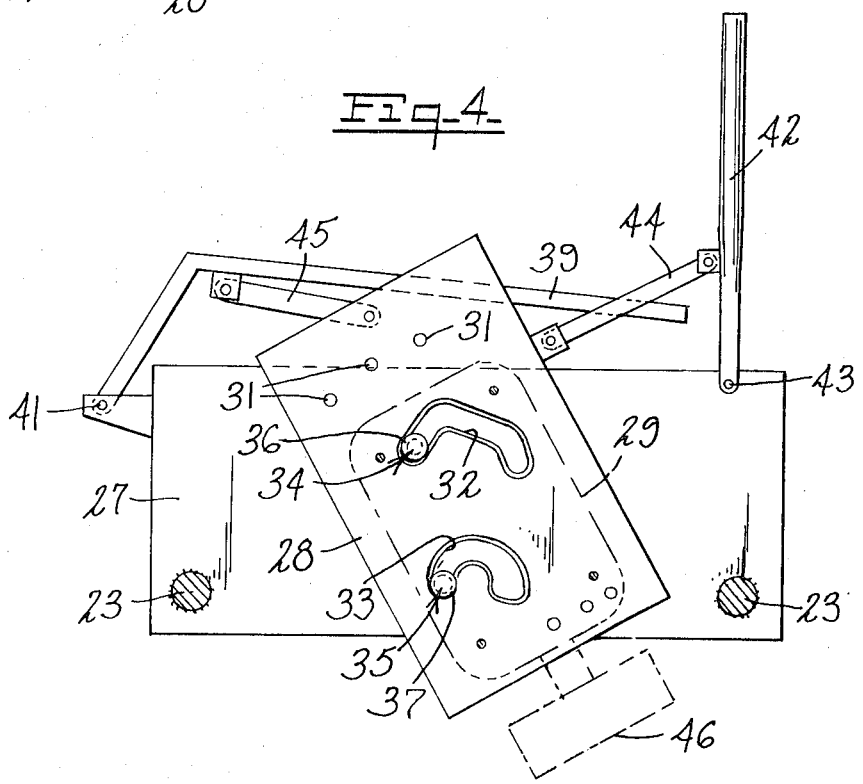
FIG. 4 is a vertical section along the line 4—4 of FIG. 2.

As best shown in FIG. 4, movable plate 28 is provided with a series of indexing apertures 31. Stationary plate 27 may have a similar plurality of apertures, for receiving one or more bolts therethrough, for affixing or "setting" the position of plate 28 relative to plate 27. Alternatively, plate 27 may be provided with upstanding bolts rather than apertures, for engaging the two plates. Also in movable plate 28 is an upper "drift" or guide slot 32 and a lower "drift" or guide slot 33. Bolt heads or guide pins 34 and 35 project through the slots 32 and 33 from plate 27 and preferably have flanged heads 36 and 37 for permanent placement in slots 32 and 33. The slots 32 and 33 are the indexing apertures 31 are located such that the plate 28 with the motor 29 mounted thereon may be moved to any desired angle, the plates 27 and 28 then being locked or set in relative position, as by lock bolts passing through one or more indexing holes 31.

The positioning of movable plate 28 on plate 27 is facilitated by a lever arm 39 pivoted at 41 and a lever arm 42 pivoted at 43. The lever arms are connected to the plate 28 through linkages 44 and 45. By means of the foregoing plates and lever arms the radial cutter head 46 of the saw may be set at any desired angle such that the parallel cutter blades 47 can make the desired notch in the log. A motor-pump unit 48 (FIG. 2) operates the hydraulic cylinders which activate the clamping bars 14 and 15 and the sliding rods 23.

In operation, a beam 12 is rolled or otherwise moved into position on table 21a and locked thereon uner clamping bars 14 and 15. The cutter blades 47 are then moved into contact with the beam by actuation of the slide rods 23, the cutter head 46 having been preset at the proper angle by manipulation and setting of movable plate 28 on plate 27, in the manner described above.

Accordingly, the rafter beam notching apparatus of the invention provides efficient notching but without requiring inclination of the beam from the horizontal as has been the standard practice in the art heretofore.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. An apparatus for notching rafter beams and the like, comprising:
 a frame having a table adapted for generally horizontal placement thereon of a rafter beam;
 said frame including a superstructure portion above said table;
 a pair of rods slidably mounted on said superstructure portion and arranged for horizontal travel in unison transversely of the longitudinal axis of a rafter beam on said table;
 a first vertical support plate fixedly mounted on said rods transversely thereof so as to travel with said rods;
 said first support plate having at least one guide pin projecting from a surface thereof;
 a second vertical support plate having at least one guide slot therethrough, said slot being positioned to receive said pin such that said second plate may be arranged in coplanar contact with said first plate in a plurality of predetermined positions; and
 a power driven rotary saw having its motor fixedly mounted on said second plate and its cutter extending downwardly between said rods, such that said rotary saw travels horizontally with said rods for cutting contact with said beam, and said saw may be set at a plurality of angles to the horizontal corresponding to said plurality of positions of said second plate on said first plate, whereby notches of predetermined dimensions may be cut in said beam.

2. Apparatus as in claim 1 further including clamping means for holding said beam in place on said table.

3. Apparatus as in claim 1 further including means for hydraulically moving said rods.

4. Apparatus as in claim 1 wherein each of said first and second plates have indexing apertures therethrough for receiving means for setting the position of said second plate relative to said first plate.

5. Apparatus as in claim 1 further including lever arm means for moving said second plate relative to said first plate.

6. Apparatus as in claim 1 wherein said guide pin has a flanged head for holding said second plate in coplanar relationship with said first plate.

* * * * *